United States Patent Office 3,810,764
Patented May 14, 1974

3,810,764
METHOD OF PRODUCING EXPANDED, TEXTURED PROTEIN PRODUCTS
Doyle H. Waggle, Webster Groves, Mo., assignor to Ralston Purina Company, St. Louis, Mo.
No Drawing. Filed May 25, 1970, Ser. No. 40,382
Int. Cl. A23j 1/14
U.S. Cl. 426—241
22 Claims

ABSTRACT OF THE DISCLOSURE

A method for producing expanded, textured protein products wherein a mixture of oleaginous seed materials and an aqueous liquid having a specified pH is formed and then mechanically tempering to impart surface orientation characteristics to the material and later isobarically heating to produce a bland, expanded, functional protein product.

BACKGROUND OF THE INVENTION

The present invention relates to edible protein products and, more particularly, to those products which can be expanded under controlled isobaric pressure conditions.

Various types of expanded food products are presently known in the art, e.g., bread, cakes, etc. These products contain high percentages of starch and low concentrations of protein, about 20% or less, and because of this composition are not ordinarily used in food products requiring extreme cooking conditions. Such products lack physical stability in the presence of high heat and moisture surroundings and tend to either form a dough mass or lose physical integrity. Other expanded products are known to the art wherein such products contain a relatively high concentration of protein and are primarily used as food additives or supplements. Due to the high protein content, these products have excellent physical stability and will withstand extreme heat and moisture conditions. Products containing moderately high concentrations of protein are presently produced by methods which require the use of both heat and sudden differential pressure, e.g., extrusion methods. It is also known to use other devices which use a very rapid change in pressure to produce expanded protein products. Gun puffing has been used to expand protein material by subjecting the material to high heat and steam pressure and then suddenly releasing the material to atmospheric pressure where the steam puffs the material and expands it. It would be extremely desirable to provide a process which would produce expanded protein products at isobaric pressure to eliminate the necessity of employing the massive and expensive mechanical equipment necessary in currently known methods to obtain the required heat and rapid change in pressure.

SUMMARY OF THE INVENTION

In accordance with the present invention, an expanded, textured protein product is produced in a method which comprises the steps of mixing together ingredients comprising secondary protein source material containing at least about 35% by weight protein and an aqueous liquid, said mixture having a pH in the range of from about 5 to about 10, mechanical tempering the mixture, subjecting the mixture to elevated temperatures and a constant pressure, said temperatures being sufficient to cause expansion of the mixture to form an expanded, substantially water-insoluble, irreversible cross-linked structure and cooling the resulting product. A wide variety of proteinaceous or oleaginous materials can be used in the process of the invention, for example high DPI oilseed flakes or meals, toasted flakes or meals (those materials which have been denatured to some degree by heat), protein isolates, and full fat oilseed flours. However, materials which have been severely heat treated (highly denatured or burned) are not satisfactory.

The mechanical tempering step is a method of influencing the structure and properties of the finished product and is roughly analogous to the process of tempering metals, particularly the process of tempering or hardening metals with mechanical energy, or to the processes of hardening candy, such as taffy, by pulling. To mechanically temper the mixed protein material it is subjected to various mechanical processes, such as rolling, folding, or stretching to impart the necessary properties to the mixture and to the final expanded product. The mechanical tempering can be modified by using various reagent materials during the mechanical tempering operation.

The product formed in accordance with the invention is an expanded, irreversible gel having excellent physical properties, e.g., texture, moisture stability and tensile strength, which properties make it particularly suitable for various food uses. The product absorbs several times its weight in water, has excellent tensile strength whether dry or very wet and, in addition, retains these excellent physical properties even after being subjected to extreme heat and moisture conditions such as by cooking.

DESCRIPTION OF THE PREFERRED EMBODIMENTS

The present invention is best accomplished by mixing together oleaginous seed materials containing at least about 35% by weight protein and an aqueous liquid. Water is the preferred aqueous liquid, but whey, blood, milk or other aqueous liquids could be used if desired. Such oleaginous seed materials include processed soybeans, isolated soy protein, soy flour, defatted soy flakes, cottonseed meals, sesame seed meals, peanut meals and the like. Other secondary protein sources such as yeast or meat by-product meal may also be used. Although it is preferred that substantially undenatured protein materials be employed, it is understood that partially toasted or partially hydrolyzed protein materials may also be employed where the degree of denaturation or hydrolysis is such that the proteinaceous liquid mixture expands to form the product of the invention. Severely denatured or hydrolyzed materials are not satisfactory. Furthermore, any of the protein containing materials employed in the invention should have water dispersible properties, such properties making the protein available to form the expanded structure of the invention. It has been found that the product of the invention must contain at least about 35% by weight protein in order to obtain the desired physical properties such as the desired texture, degree of expansion, tensile strength, etc. Since the particular product of the invention has a variety of uses, it is essential that the product substantially maintain its physical characteristics and integrity under cooking conditions. In contrast, bread products containing substantially less protein cannot maintain their integrity under such conditions and tend to disintegrate. The most favorable results are obtained when the ratio of protein containing material to the aqueous liquid is from about 1:0.2 to about 1:4 and preferably about 1:0.4 to about 1:2 by weight. It is to be understood that other ingredients such as color, flavoring and the like may be added to the mixture to obtain specific end products.

After mixing together the substantially undenatured oleaginous seed material and the aqueous liquid, it may be necessary to adjust the pH of said mixture to provide the necessary conditions for expanding the product. It has been found that the best results are obtained where the mixture has a final pH of from about 5 to about 10 and preferably from about 5.5 to about 9.5. Where the pH is below about 5, it has been found that the product gels and discolors to form a crumbly product and does not have desirable water absorption properties. Where the pH is above about 10, it has been found that the resulting product has poor color and undesirable, unappealing physical characteristics. Where it is necessary to adjust the pH within the above described range, the pH may be adjusted by the use of suitable chemical compositions such as sodium hydroxide, ammonium hydroxide, ammonium carbonate, ammonium bicarbonate, sodium carbonate, trisodium phosphate, sodium bicarbonate, potassium phosphate, potassium carbonate, potassium bicarbonate, and the like.

The aqueous protein mixture is then subjected to a mechanical tempering operation to impart desired physical properties to the mixture and to the final product. A variety of methods may be used to mechanically temper the protein mixture, depending on the particular configuration and properties desired in the final expanded product. The mixed material may be rolled, stretched, folded, or worked with mechanical beaters or even subjected to several combinations of mechanical tempering steps. The mechanical tempering operation aids in imparting a high degree of orientation to the protein structure which is later set in the isobaric heating-expansion step. The high degree of orientation of the structure improves the resilient, chewy, and meat-like properties of the material. I have found that a rolling step is particularly advantageous in imparting the desired meat-like characteristics in the final expanded product. The rolling operation imparts a degree of mechanical tempering which provides a meat-like expanded product which has the ability to absorb water and aqueous liquids, is tough, resilient and chewy, and which will maintain its structure and physical properties when subjected to heat.

The mechanical tempering operation and the texture of the final product is greatly influenced by the presence of various humectant and preservative solvent materials in the aqueous proteinaceous mix. Typical preservative organic solvent and humectant materials are glycerol and 1,2-propanediol. By incorporating from 10 to 50% by weight of the proteinaceous material of organic solvent material in the aqueous liquid, mechanical tempering action, and expanding the proteinaceous mix into an irreversible structure, a product is formed which will remain stable and resistant to bacterial and mycotic contamination and which will have a pleasing soft, plasticized texture after prolonged storage under room temperature conditions. Other reagents may also be adde to the proteinaceous mix to influence the mechanical tempering operation or to impart other properties to the protein product. Sulfur, salt, sodium sulfite, sodium bicarbonate, calcium carbonate, hydrogen peroxide, cysteine, sodium hypophosphite, or other food grade reagents may be added to the proteinaceous mix to modify the properties of the protein product. Cysteine may be particularly useful because it supplements the amino acid content of the proteinaceous source.

The mechanically tempered protein material-aqueous liquid mixture is then subjected to elevated temperatures at isobaric pressure conditions to accomplish expansion and heat-setting of the mixture. The elevated temperatures should be acomplished by means of a radiant energy source which will generate the heat uniformly throughout the mass of the proteinaceous mix. Radiant energy having a wave length which will penetrate the mass of the mix is effective to generate the heat uniformly throughout the mass. Devices of the microwave type which have a wave length tuned to resonate the water molecules are most satisfactory. However, magnetostriction or induction devices which will resonate the water or protein molecules may also be used. The temperatures employed to achieve and retain the expanded structure of the product are dependent upon the residence time of the product being exposed to the radiant energy and the boiling point of water at the pressure used in the process. The effective temperature limit is the boiling point of water at the pressure conditions used in the process. The pressure and temperature conditions must be sufficient to heat denature the protein enough to set the protein in an irreversible structure after the structure is formed by the expanding steam from the boiling water. A practical minimum temperature required to set soy or other oilseed materials is about 180° F. Is addition, the temperature must not be so high as to destroy or degrade the protein structure when it is formed. The oilseed materials have a maximum temperature of about 400° F. For an isobaric process operating at atmospheric pressure the temperature limit is about 212° F., the boiling point of water. A typical residence time for the product in a process operating at atmospheric pressure would be about 30 to 90 seconds.

After the product has been heated and expanded in accordance wtih the above procedures, it may be cooled or dehydrated and subsequently processed into a suitable form for further processing into various food products.

The substantially undenatured oleaginous seed materials employed in the invention may be in a variety of forms. For example, full fat soy flours and defatted soy flours have been found to produce expanded products which offer the highly desirable characteristics hereinbefore discussed. Materials containing a higher percentage of protein such as isolated soy protein may also be employed to obtain the same desirable characteristics.

A particular advantage is apparent if oilseed flours, such as soy, are used. These materials contain a high protein content of about 35 to 55% by weight and are valuable for their nutritional potential. However, oilseed flours contain some off flavor factors which inhibit their use as foods. Soy in particular has an extremely bitter or beany flavor which humans find very unpleasant. Oilseed, especially soy, utilization in human foods can be greatly increased if an economical process is provided which not only provides a pleasing, functional protein structure, but also eliminates the bitter off flavors typical of oilseeds. I have found that by processing oilseed flours by the process described, i.e., by subjecting aqueous mixtures of oilseed flours to a mechanical tempering action and/or exposure to a heat source of the radiant energy type, I am able to eliminate or substantially reduce the bitter and off flavors characteristic of oilseeds and thereby render these materials suitable for use in economical human foods as protein sources. The use of oilseed flours as human protein contributes a significant economic advantage by eliminating costly protein isolation procedures which are presently used to obtain a bland protein. By providing a process which produces a bland protein food product directly from the oilseed flour source I have eliminated the necessity of using a costly isolation procedure to obtain a bland protein.

The particular chemical reaction which eliminates the bitter flavor factors is not known. However, I believe that the radiant energy heat source stimulates the protein and carbohyrate molecules present in the oilseed flours to react in a way which cleaves off the bitterness causing constituents on the molecules and forms bland chemical end products. The ability of the radiant energy heat source to remove off-flavors may be increased by the prior mechanical tempering treatment given the oilseed flour-aqueous mixture. The mechanical tempering action may assist in exposing the bitter constituents on the molecules or in permeating the particle matrix with water which takes part in the debittering reaction.

The expanded product of the invention is, in essence, an irreversible cross-linked structure which has been expanded and heat-set to retain the expanded shape or confiugration. The product in that form exhibits excellent physical properties such as desirable texture and moisture stability. For example, a dried product has been found to sorb up to about four times its weight in water and yet retain its desirable physical properties. There is no physical deterioration such as crumbling due to absorption of large amounts of moisture as is characteristic of bread-type products which tend to physically disintegrate upon exposure to excessive amounts of moisture. Furthermore, the product of the invention substantially maintains its integrity and desirable physical characteristics even when subjected to severe cooking conditions such as cooking under high temperatures and pressures for preparing food products. Because of the above described properties, the product of the invention is suitable for use in a variety of food products.

The most significant advantage of the present invention is found in the process of making the product. Said product may be produced by expanding at isobaric conditions whereas heretofore similar types of products could only be made in the presence of heat and differential pressure. It is essential to note that the expansion at isobaric conditions to produce an irreversible structure is possible through the particular combination of the amount of protein present in the protein material, amount of aqueous liquid present in relation to the protein structure, the degree of mechanical tempering, and the pH of the resulting mixture of protein material and aqueous liquid. Furthermore, the particular process of the invention obviates the necessity of employing heavy duty, massive mechanical equipment currently necessary to generate large differential pressures to produce similar types of products.

The following examples are illustrative of the invention and are not intended to limit the scope thereof.

EXAMPLE 1

One hundred grams of solvent extracted soybean meal having a protein content of 50% by weight and a DPI of 70% was mixed with 175 ml. of water in a Brabender Sigma blade food mixer for about five minutes. The mixed material was separated into discrete chunks of about 60 grams and the chunks were rolled into rods about 1" in diameter and 3" in length. The material was rolled on a pair of canvas belts for about 15 seconds to form the rods and to impart the desired surface characteristics to the material. The formed rods were then placed on a moving belt and passed at atmospheric pressure through a Varian microwave oven with a residence time of about 60 seconds. (1 kwh., 220 v., 2450 mc.). The product removed from the microwave oven was a puffed, expanded product which had a tough, resilient structure and would not tear easily. The product was sliced and the internal structuure was observed to be cellular and it had a definite orientation due to the shape of the cells and their connective membranes. The material had a chewy resistance and mouthfeel similar to that of meat. A slice of the material was dried and weighed. When the dried material was immersed in room temperature water and removed, it was observed that the slice had sorbed 120% of its original weight in water in twelve minutes and would not tear easily even though containing the large amount of water. The material exhibited a very bland flavor free of the typical soy or beany taste.

EXAMPLE 2

One hundred grams of toasted, solvent extracted soybean meal having a protein content of 50% by weight and a DPI of 34% was mixed with 100 ml. of water in a Brabender mixer for about five minutes. The mixed material was formed and mechanically tempered as described in Example 1 and heated in the microwave oven as described in Example 1. The product removed from the microwave oven was a puffed, expanded product which had a tough, resilient structure and would not tear easily. The product was sliced and the internal structure was observed to be cellular and it had a definite orientation due to the shape of the cells and the arrangement of the cell connective membrane. The material had a chewy resistance and mouthfeel similar to that of meat. A slice of the material was dried and weighed. When the dried material was immersed in room temperature water and removed, it was observed to have sorbed 170% of its original weight in water in twelve minutes and would not tear easily even though containing the large amount of water. The material exhibited a very bland flavor free of the typical soy or beany taste.

EXAMPLE 3

One hundred grams of full fat soy flour having a protein content of about 35% by weight and a DPI of 85% was mixed with 100 ml. of water in a Brabender mixer for about ten minutes. The mixed material was formed, mechanically tempered and heated as described in Example 1. The product removed from the microwave oven was a puffed, expanded product which had a tough, resilient structure and would not tear easily. The product was sliced and the internal structure was observed to be cellular and it had a definite orientation due to the shape of the cells and the arrangement of the connective membrane. The material had a chewy resistance and mouthfeel similar to that of meat. A slice of the material was dried and weighed. When the dried material was immersed in room temperature water and removed, it was observed to have sorbed 170% of its original weight in water in twelve minutes and would not tear easily even though containing the large amount of water. The material exhibited a very bland flavor free of the typical soy or beany taste. The product had a residual oil content of 20% by weight.

EXAMPLE 4

One hundred grams of toasted, solvent extracted soybean meal having a protein content of 50% by weight and a DPI of 34% was mixed with 70 ml. of water in a Brabender mixer for about five minutes. 0.3% sulfur by weight was mixed in with the meal and water. The mixed material was formed, mechanically tampered and heated as described in Example 1. The product removed from the microwave oven was a puffed, expanded product which had a resilient texture similar to that produced in Example 2, but was slightly tougher. The dried product sorbed 140% of its weight in one minute when reconstituted with water. The product had a bland flavor.

EXAMPLE 5

One hundred grams of toasted, solvent extracted soybean meal having a protein content of 50% by weight and a DPI of 34% was mixed with 60 ml. of water and 15 grams of glycerol in a Baker-Perkins mixer for about 30 minutes. The mixed material was formed, mechanically tempered and heated as described in Example 1. The product removed from the oven had a puffed, expanded structure and a tough, resilient texture which did not tear easily. The product had a soft dry texture and a chewy resistance and mouthfeel similar to that of meat. The product analyzed 30% moisture (Karl Fischer) and 10% glycerol by weight. The product was sliced and the internal structure was observed to be cellular and it had definite orientation due to the shape of the cells and the arrangement of the cell connective membrane. The product was not dried due to the low moisture content of the product after forming. The product was rehydrated as is and sorbed 135% of its weight in water in twelve minutes. The rehydrated product would not tear easily even though containing the large amount of water. The product had a bland flavor.

EXAMPLE 6

One hundred grams of toasted, solvent extracted soybean meal having a protein content of 50% by weight and a DPI of 34% was mixed with 50 ml. of water and 35 grams of 1,2-propanediol in a Baker-Perkins mixer for about 30 minutes. The mixed material was formed, mechanically tempered, and heated as described in Example 1. The product removed from the oven had a puffed, expanded structure and a tough, resilient texture which did not tear easily. The texture was soft and dry. The product had a chewy resistance and mouthfeel similar to that of meat. The product analyzed 25% moisture (Karl Fischer) and 20% 1,2-propanediol by weight. The product was sliced and the internal structure was observed to be cellular and it had definite orientation due to the shape of the cells and the arrangement of the cell connective membrane. The product was not dried due to the low moisture content of the product as produced. The product was rehydrated as is and sorbed 72% of its weight in water in twelve minutes. The rehydrated product would not tear easily even though containing the large amount of water. The product had a bland flavor.

EXAMPLE 7

One hundred grams of toasted, solvent extracted soybean meal having a protein content of 50% by weight and a DPI of 34% was mixed with 60 ml. of water, 10 grams of 1,2-propanediol, and 10 grams of glycerol in the mixer described in Example 3 for about 30 minutes. The mixed material was formed, mechanically tempered and heated as described in Example 1. The product removed from the oven had a puffed, expanded structure and a tough resilient texture which would not tear easily. The product had a soft dry texture and a chewy resistance and mouthfeel similar to that of meat. The product contained 25% moisture (Karl Fischer), 8% glycerol, and 7% 1,2-propanediol by weight. The product was sliced and the internal structure was observed to be cellular and it had definite orientation due to the shape of the cells and the arrangement of the cell connective membrane. The product was not dried due to the low moisture content of the product after forming. The product was rehydrated as is and sorbed 100% of its weight in water in twelve minutes. The rehydrated product would not tear easily even though containing the large amount of water. The product had a bland flavor.

EXAMPLE 8

One hundred grams of solvent extracted soybean meal having a protein content of 50% by weight and a DPI of 70% was mixed with 60 ml. of water and 25 grams of glycerol in the mixer described in Example 6 for about 30 minutes. The mixed material was formed, mechanically tempered and heated as described in Example 1. The product removed from the oven had a puffed, expanded structure and a tough, resilient texture which did not tear easily. The product had a soft dry texture and a chewy resilience and mouthfeel similar to that of meat. The product analyzed 30% moisture (Karl Fischer) and 14% glycerol by weight. The product was sliced and the internal structure was observed to be cellular and it had definite orientation due to the shape of the cells and the arrangement of the cell connective membrane. The product was not dried due to the low moisture content of the product after forming. The product was rehydrated as is and sorbed 80% of its weight in water in twelve minutes. The rehydrated product would not tear easily even though containing the large amount of water. The product had a bland flavor.

Samples of the product produced by the method of Examples 5-8 were stored at room temperature for 14 days. The samples did not exhibit signs of mold growth or bacterial spoilage even though the products contained over 15% moisture, a level above that at which microbial growth would normally occur in a product of this type.

It is realized that variations in these and related factors could be readily made within the concept taught herein. Hence, the invention is intended to be limited only by the scope of the appended claims and the reasonably equivalent methods, apparatus, and products to those defined therein.

I claim:

1. A method of producing a textured porous expanded food product having meat simulating textural characteristics, from a secondary protein source material selected from the group consisting of oleaginous seed materials, byproduct meals, and microbial protein having a protein content of at least about 35% by weight comprising forming a proteinaceous mix of the secondary protein source material and an aqueous liquid, the ratio of secondary protein source material to aqueous liquid being between about 1:0.2 and 1:4, to form a mixture having a pH between about 5 and 10, mechanically tempering the mix to impart surface orientation characteristics to the material, isobarically heating the proteinaceous mix to a temperature sufficient to cause expansion by exposing the mix to a source of radiant energy to convert a portion of the aqueous liquid to steam, and expand the proteinaceous mix under the isobaric conditions to form an expanded proteinaceous network, and heat setting the expanded network into an irreversible, substantially water insoluble, cross-linked structure having a resilient texture and chewing and mouthfeel characteristics similar to those of meat.

2. A method of treating protein containing material to form a textured cellular palatable and nutritious food product that bears resemblance to meat in appearance, resilience, physical structure and texture, and chewing characteristics comprising the steps of providing a secondary protein source material of the group consisting of oleaginous seed materials, microbial protein, and byproduct meals having a protein content of at least about 35% by weight, forming a proteinaceous mix of the protein source and an aqueous liquid, the ratio of secondary protein source material to aqueous liquid being between about 1:0.2 and 1:4, to form a mixture having a pH between about 5 and 10, mechanically tempering the mix to impart surface effect characteristics to the material, heating the proteinaceous mix isobarically to a temperature sufficient to cause expansion by exposing the mix to a source of microwave energy to convert a portion of the aqueous liquid to steam and expand the proteinaceous mix under isobaric conditions to form an expanded proteinaceous network, and heat setting the expanded network into an irreversible, substantially water insoluble, cross-linked structure having a resilient texture and chewing and mouthfeel characteristics similar to those of meat.

3. A method of converting a protein containing material into a palatable and nutritious product that bears resemblance to meat in appearance, physical structure and texture and chewing characteristics comprising the steps of providing a secondary protein source material from the group consisting of oleaginous meals, byproduct meals, and microbial protein having a protein content of above about 35% by weight, forming a proteinaceous mix of the protein source and an aqueous liquid containing an organic solvent selected from the group consisting of 1,2-propanediol, glycerol, and mixtures of glycerol and 1,2-propanediol, the ratio of secondary protein source material to aqueous liquid being between about 1:0.2 and 1:4, to form a mixture having a pH between about 5 and 10, imparting surface effect characteristics to the proteinaceous mix, converting a portion of the aqueous liquid to steam by isobarically heating the mix to a temperature sufficient to cause expansion of the proteinaceous mix under substantially isobaric conditions to form an expanded proteinaceous network, and heat setting the expanded network into an irreversible, substantially water insoluble, cross-linked structure having a resilient texture and chewing and mouthfeel characteristics similar to those of meat.

4. The method of claim 3 wherein the proteinaceous mix is heated by exposure to a source of microwave energy.

5. The method of claim 3 wherein the secondary protein source is soybean protein.

6. The method of claim 3 wherein the proteinaceous mix contains between about 0.1 and 3% by weight sulfur.

7. The method of claim 3 wherein the heating step is conducted at substantially atmospheric pressure.

8. The method of claim 7 wherein the proteinaceous mix is heated to about 212° F.

9. The method of claim 3 wherein the proteinaceous mix is heated for between about 30 and 90 seconds.

10. The method of claim 3 wherein the organic solvent is added at a level of between about 10 and 50% by weight of the mixture.

11. The method of claim 3 wherein the irreversible, substantially water insoluble, cross-linked textured food structure contains a residual organic solvent content of between about 10 and 40% by weight.

12. A method of producing a textured, porous, expanded food product having meat simulating textural characteristics from a secondary protein source material selected from the group consisting of oleaginous seed materials, byproduct meals, and microbial protein having a protein content of at least about 35% by weight comprising mixing the secondary protein source and an aqueous liquid, the ratio of secondary protein source material to aqueous liquid being between about 1:0.2 and 1:4, to form a mixture having a pH between about 5 and 10, mechanically tempering the mix to impart surface effect characteristics to the materially, generating heat internally of the mass of the proteinaceous mix under isobaric conditions sufficient to produce steam and expand the proteinaceous mix into a proteinaceous network and heat setting the expanded network into an irreversible, substantially water insoluble, cross-linked structure having a resilient texture and chewing and mouthfeel characteristics similar to meat.

13. The method of claim 12 wherein the aqueous liquid is water.

14. The method of claim 12 wherein the secondary protein source is a source of soybean protein.

15. The method of claim 12 wherein the proteinaceous mix contains between about 0.1 and 3% by weight sulfur.

16. The method of claim 12 wherein the heating step is conducted at substantially atmospheric pressure.

17. The method of claim 16 wherein the proteinaceous mix is heated to about 212° F.

18. The method of claim 12 wherein the ratio of proteinaceous material to aqueous liquid is between about 1:0.2 and 1:4 by weight.

19. The method of claim 18 wherein the ratio of proteinaceous material to aqueous liquid is between about 1:0.4 and 1:2 by weight.

20. A method of producing a textured, porous expanded food product from a soybean protein source having a protein content of at least about 35% by weight comprising forming a proteinaceous mix of the soybean protein source material and an aqueous liquid having a ratio of proteinaceous source to the aqueous liquid of between about 1:0.4 to about 1:2 by weight, mechanically tempering the mix by forming discrete particles of the mix, subjecting the particles to a mechanical rolling step to shape the particles and to impart surface effect orientation characteristics to the particles, exciting the water molecules of the aqueous liquid to generate heat internally in the mass of the proteinaceous mix and to convert a portion of the aqueous liquid to steam, the steam expanding the proteinaceous mass under atmospheric isobaric conditions at a temperature of about 212° F. to produce an expanded proteinaceous network, and heat setting the expanded network into an irreversible, substantially water insoluble, cross-linked structure having a bland taste, a resilient texture and chewing and mouthfeel characteristics.

21. The method of claim 20 wherein water molecules in the mix are excited by microwave energy selected from the group of frequencies consisting of 915 mc. and 2450 mc.

22. A method of producing a textured, porous, expanded food product having meat simulating textural characteristics from a secondary protein source material selected from the group consisting of oleaginous seed materials, byproduct meals and microbial protein having a protein content of at least about 35% by weight comprising forming a proteinaceous mix of the secondary protein source material and an aqueous liquid, the ratio of secondary protein source material to aqueous liquid being between about 1:0.2 and 1:4 to form a mixture having a pH between about 5 and 10, subjecting the mix to means to mechanically temper the mix to impart surface orientation characteristics to the material, isobarically heating the proteinaceous mix to a temperature sufficient to cause expansion by exposing the mix to a source of radiant energy to convert a portion of the aqueous liquid to steam and expand the proteinaceous mix under and isobaric conditions to form an expanded proteinaceous network, the heat setting the expanded network into an irreversible, substantially water insoluble, cross-linked structure having a resilient texture and chewing and mouthfeel characteristics similar to those of meat.

References Cited
UNITED STATES PATENTS
3,488,770   1/1970   Atkinson _____ 99—17

A. LOUIS MONACELL, Primary Examiner

W. A. SIMONS, Assistant Examiner

U.S. Cl. X.R.

260—123.5

UNITED STATES PATENT OFFICE
CERTIFICATE OF CORRECTION

Patent No. 3,810,764  Dated May 14, 1974

Inventor(s) Doyle H. Waggle

It is certified that error appears in the above-identified patent and that said Letters Patent are hereby corrected as shown below:

Column 3, line 47 - "added" should be inserted for "adde"
Column 3, line 61 - "accomplished" should be inserted for "acomplished".
Column 4, line 7 - "In" should be inserted for "Is".
Column 4, line 17 - "with" should be inserted for "wtih".
Column 5, line 46 - "structure" should be inserted for "structuure".
Column 6, line 35 - "tempered" should be inserted for "tampered".
Column 10, line 34 - "the" should be inserted for "and" before isobaric.
Column 10, line 36 - "and" should be inserted for "the" before heat.

Signed and sealed this 24th day of September 1974.

(SEAL)
Attest:

McCOY M. GIBSON JR.
Attesting Officer

C. MARSHALL DANN
Commissioner of Patents